(12) United States Patent
Connor et al.

(10) Patent No.: US 6,948,610 B2
(45) Date of Patent: Sep. 27, 2005

(54) CARGO LOADING APPARATUS

(76) Inventors: Buddy Wiley Connor, 180 N. Quail Cir., Wilkesboro, NC (US) 28697; John Wilson Godfrey, 336 Patterson St., Troutman, NC (US) 28166

( * ) Notice: Subject to any disclaimer, the term of this patent is extended or adjusted under 35 U.S.C. 154(b) by 98 days.

(21) Appl. No.: 10/388,957

(22) Filed: Mar. 14, 2003

(65) Prior Publication Data

US 2003/0198543 A1 Oct. 23, 2003

Related U.S. Application Data

(60) Provisional application No. 60/373,563, filed on Apr. 18, 2002.

(51) Int. Cl.[7] .............................................. B65G 31/04
(52) U.S. Cl. ...................... 198/642; 198/638; 414/301; 414/339
(58) Field of Search ................................ 414/293, 332, 414/339, 398, 139.4, 301; 198/642, 638

(56) References Cited

U.S. PATENT DOCUMENTS

| | | | | |
|---|---|---|---|---|
| 2,605,106 A | * | 7/1952 | Gilmore | 241/273.3 |
| 2,788,115 A | * | 4/1957 | Friedman | 414/301 |
| 2,871,021 A | * | 1/1959 | Baldridge | 198/642 |
| 3,195,711 A | * | 7/1965 | Bogdan et al. | 198/612 |
| 3,228,701 A | * | 1/1966 | Smith et al. | 241/273.3 |
| 3,592,393 A | * | 7/1971 | Sinden | 239/669 |
| 3,592,394 A | * | 7/1971 | Sinden | 239/669 |
| 3,755,931 A | * | 9/1973 | Gisler | 37/252 |
| 4,081,074 A | * | 3/1978 | Stone | 198/638 |
| 4,968,211 A | * | 11/1990 | Compton | 414/502 |
| 5,348,434 A | | 9/1994 | Peeples et al. | |
| 5,735,319 A | | 4/1998 | McNamara et al. | |
| 2004/0045628 A1 | * | 3/2004 | Bailey | 141/286 |

* cited by examiner

*Primary Examiner*—Khoi H. Tran
(74) *Attorney, Agent, or Firm*—Cowan Liebowitz & Latman, P.C.

(57) ABSTRACT

A cargo loading apparatus and method tightly and efficiently disperse material pieces such as wood chips into a cargo space. The loading apparatus includes an elongated symmetrical body such as an elongated cylinder having vanes or blades along the surface thereof. The apparatus is mounted across the stream of material pieces. As the body rotates through the stream of pieces, the vanes strike the pieces and disperse them within the cargo space. In one embodiment the vanes are mounted parallel to the axis of rotation of the apparatus and thus disperse the pieces primarily in a direction perpendicular to the axis of rotation. In another embodiment, at least some of the vanes are mounted at an angle with respect to the axis of rotation and thus disperse the materials in a fan-shaped pattern. The vanes can include a detachable wear plate mounted to a support bracket which may be readily replaced without having to repair or replace other parts of the apparatus. The simplicity of the design of this loading apparatus permits it to be readily installed in existing facilities without extensive modification of such facilities.

10 Claims, 2 Drawing Sheets

CARGO LOADING APPARATUS

PRIOR PROVISIONAL APPLICATION

The inventors hereby claim for this application the filing date of Provisional Application No. 60/373,563 filed Apr. 18, 2002.

FIELD OF THE INVENTION

This invention relates to apparatus for loading transportation vessels such as ships, barges, railroad cars and trucks with material pieces such as wood chips.

BACKGROUND OF THE INVENTION

Compact storage of material pieces such as wood chips in the cargo space of transportation vessels provides greater efficiency and reduced costs in shipping. Various techniques and apparatus are known and have been used for achieving more compact and efficient storage than could be obtained by simply dumping or dropping such pieces into the storage space. For example, U.S. Pat. Nos. 5,348,434 and 5,735,319 disclose apparatus for achieving more compact storage of such pieces by using cone-shaped impellers for dispersing or distributing the pieces within the storage space.

However, all of these prior techniques and apparatus have various limitations including complex designs for the dispersing apparatus which makes such apparatus relatively expensive, requirements for substantial unique apparatus for feeding or channeling the pieces to the dispersing apparatus and other limitations which add significantly to the cost of using such techniques and apparatus. For example, the inventions disclosed in the aforementioned patents require substantial, special design, auxiliary apparatus for properly channeling the material pieces into the interior of the impeller in order to obtain the desired dispersal pattern. Many potential applications would require extensive modifications to existing material-handling facilities in order to use these designs.

SUMMARY OF THE INVENTION

Accordingly, an object of this invention is to overcome the deficiencies and limitations of the prior art.

Another object is to provide a simple and efficient system and apparatus for loading material pieces that is easily adapted to work with the systems and apparatus normally used for handling and moving such pieces.

Another object is to provide apparatus for loading material pieces that will not require substantial modifications or additions to the facilities normally used for handling and moving such pieces.

The present invention utilizes a symmetrical body such as a cylindrical roller mounted across the stream of material pieces which has vanes or blades mounted along the surface thereof. The roller is connected to a suitable drive apparatus that rotates the roller at suitable speeds depending upon the particular application. Material pieces such as wood chips are delivered to the roller by conventional conveyors such as belts and the like. As the pieces fall onto the roller, the vanes thereon strike and disperse the pieces into the cargo space in such a manner that compact storage is achieved. The simple and compact design of this loading apparatus allows it to be mounted under the outlet of existing transport apparatus such as a belt conveyor without any substantial modifications or additions to such transport apparatus. Various configurations of the vanes can be used to obtain different dispersal patterns for the pieces being loaded.

BRIEF DESCRIPTION OF THE DRAWINGS

Various features of the present invention will become apparent from the following detailed description in conjunction with the accompanying drawings in which.

DETAILED DESCRIPTION OF THE INVENTION

Figure 1:
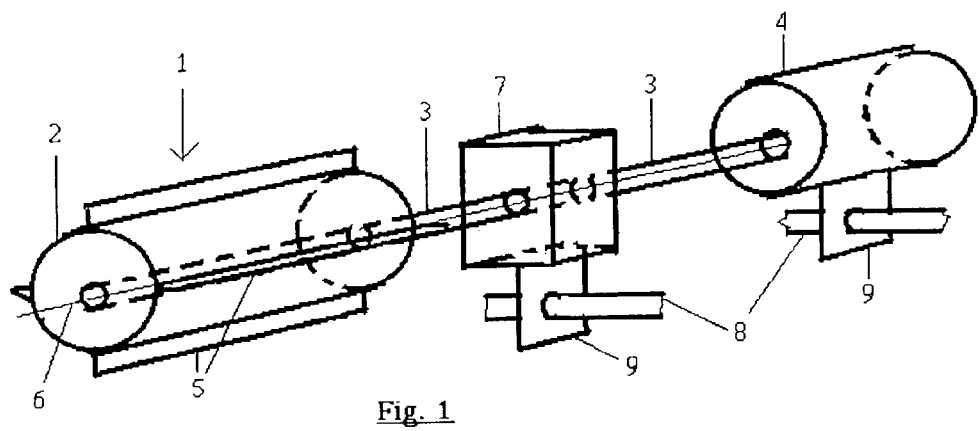
FIG. 1 is a perspective view of an apparatus made in accordance with this invention.
Figure 2:
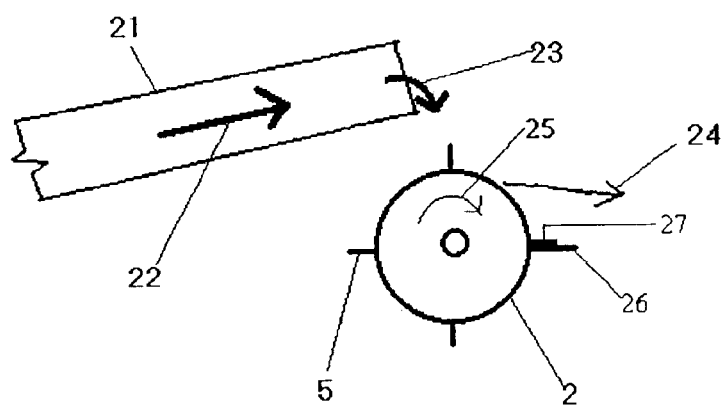
FIG. 2 is a side elevation view of the apparatus of FIG. 1 together with a conveyor or other transport system for delivering material pieces to said apparatus and indicating a typical trajectory of such pieces when they are struck by the vanes.
Figure 3:
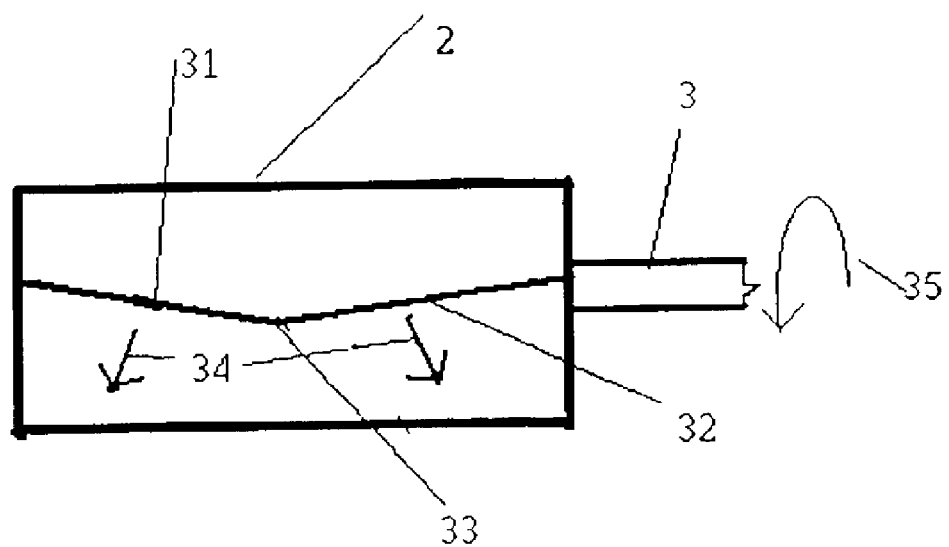
FIG. 3 is a front view of a roller with another embodiment of the invention.
Figure 4:
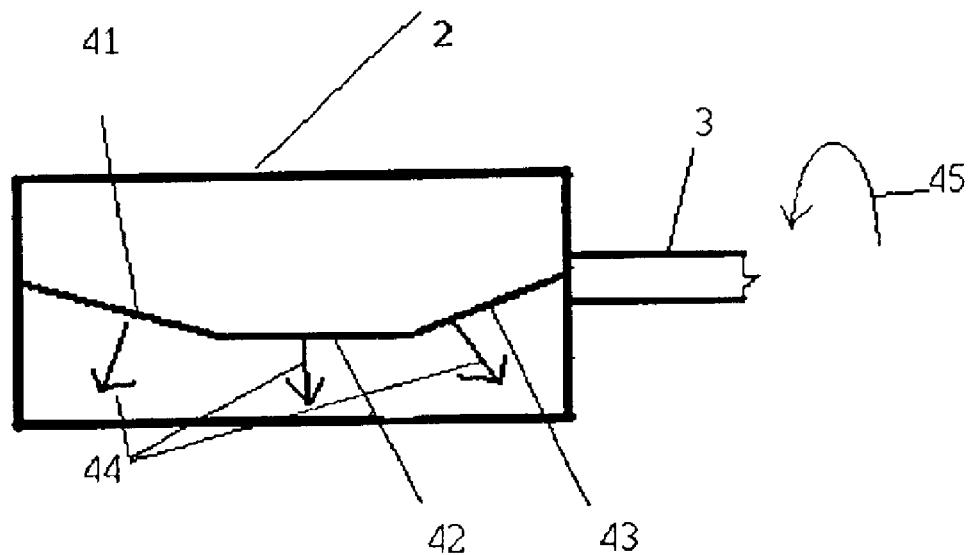
FIG. 4 is a front view of a roller with still another embodiment of the invention.

Referring now to the figures wherein like numbers designate corresponding elements throughout the several figures, FIG. 1 illustrates a first embodiment, generally denoted by reference number 1, of a novel, yet simple, apparatus for dispersing or distributing material pieces such as wood chips for compact storage in a cargo space in accordance with the present invention. A roller 2, having an axis of rotation 6, is mounted on a drive shaft or axle 3 lying along the axis of rotation 6. Drive shaft 3 is connected to a suitable motor or power apparatus 4 that can rotate drive shaft 3 and thereby rotate roller 2. An elongated cylindrical roller is shown but other configurations such as an elongated hexagonal configuration or other elongated symmetrical body could be used in various applications. An advantage of using an elongated cylindrical configuration for roller 2 is that standard rollers such as those used in large belt conveyor systems could be readily adapted for use in this invention.

Various apparatus for mounting roller 2, axle 3, and power apparatus 4, and functionally connecting them to each other are well known. For example, drive shaft 3 can be mounted in and supported with readily available support bearings 7; suitable drive motors are readily available commercially to use as power apparatus 4; and drive shaft 3 can be connected to such motor by readily available gear, belt or chain drives or connected for direct drive. For simplicity, only one support bearing 7 is shown in FIG. 1. However, in many applications another bearing might be desirable to support drive shaft 3 on the other end of roller 2.

In some applications it would be advantageous to mount support bearings 7 and power apparatus 4 on a frame or support that is movable with respect to the stream of particles being dispersed. For example, such support bearings 7 and power apparatus 4 could be mounted on support brackets 9 that can be moved or slid along rails 8 that are substantially transverse to the axis of rotation 6. Motor 4 and support bearings 7, along with roller 2, could then be moved along rails 8 and positioned in an optimum position with respect to the stream of materials. Although a very simple support bracket 9 mounted on a round rail 8 is show for illustration, various arrangements will be readily apparent for providing a movable mounting arrangement. For example, support bracket 9 could contain a wheel which rolls along a track much like a miniature railroad wheel and track arrangement.

Unlike most of the prior art apparatus, the spacing between roller 2 and power apparatus 4 is not critical thus providing much greater flexibility in the placement of power apparatus 4. For example, motor 4 might even be placed outside the cargo storage opening. The use of a reversible and a variable speed power apparatus 4 provides greater flexibility in the use of the dispersing apparatus as will be discussed further below.

Mounted along the surface of roller 2 by well-known means such as welding, screws, bolts or a combination thereof are a plurality of vanes or blades 5 for engaging the material pieces and propelling them into the storage area as roller 2 rotates across the stream of pieces. Four vanes 5 are shown in FIG. 1 for illustration only and various numbers of vanes would be suitable. In some applications ten or more vanes might be desirable. As shown in this specific embodiment, vanes 5 are mounted substantially parallel to axle 3, and thus parallel to the axis of rotation 6 of roller 2, and extend the full length of roller 2. However, as discussed below, various other configurations of vanes are included in the scope of this invention. The height and thickness of vanes 5 can of course be tailored to a particular application. In many applications, a height of one (1) to three (3) inches may be optimal.

Referring now to FIG. 2, a better understanding of the present invention can be obtained. A conventional conveyor or transport apparatus 21, such as a belt conveyor, transports a stream of material pieces such as wood chips in the direction indicated by arrow 22. The stream of pieces is discharged from the end or outlet of conveyor 21 generally in the direction indicated by arrow 23 onto the rotating roller 2 that is rotating in the direction shown by arrow 25. The pieces are engaged or struck by vanes 5 and dispersed generally along a trajectory indicated by arrow 24 into the storage compartment or area where they accumulate in a more compact and efficient layering. It should be readily apparent that the direction of rotation of roller 2 could be reversed by a simple switch arrangement on power apparatus 4 thereby dispersing the pieces in the opposite direction to that shown. This reversal of the dispersal pattern might be particularly advantageous in loading certain kinds of cargo vessels. Loading apparatus 1 could be placed near the midpoint of the cargo hold of such a vessel and then could load the entire cargo space without having to be moved. None of the prior art apparatus appears to offer such flexibility.

It also should be readily apparent that the length and diameter and speed of rotation of roller 2 can be tailored to specific applications. As indicated previously, the length, height and thickness of vanes 5 also can be tailored to specific applications. In one specific application, a roller diameter of twelve (12) inches, a roller length of forty-eight (48) inches, a vane height of two and one-half (2.5) inches and a speed of rotation of approximately twelve hundred (1200) rpm has been determined to work satisfactorily.

In one embodiment, vanes 5 have a layered or sandwich type construction as illustrated in FIG. 2. For clarity only one vane in this figure is illustrated with a layered construction. In this embodiment, vane 5 comprises a support bracket 27 that is permanently mounted on the surface of roller 2 by welding or other well-known means. A replaceable striking plate 26 is mounted to support bracket 27 by some removable means such as bolts or screws. Striking plate 26 advantageously covers the support bracket 27 and extends above it from the surface of roller 2 thereby protecting the bracket from wear. Thus, when excessive wear occurs, striking plate 26 can be easily removed and replaced without any repairs or removal of the rest of the dispersing apparatus. Such a striking plate should be mounted on the side of support bracket 27 in the direction of rotation of roller 2, that is, on the side that engages the material pieces. However, if desired, as in the case of contemplated rotation of roller 2 in both directions, replaceable striking plates 26 can be mounted on both sides of support bracket 27.

As can be seen from FIG. 2, unlike prior art systems, no special apparatus is required to deliver the material pieces from the conveyor apparatus 21 to the dispersing apparatus or roller 2. Accordingly, the apparatus of this invention is readily adaptable for use with existing facilities and is much simpler and less costly to implement than prior art systems.

FIGS. 3 and 4 show other embodiments of the present invention. For clarity, only a few vanes are illustrated in these figures, but various numbers of vanes could be used as previously indicated. FIG. 3 shows two vanes 31 and 32 that are angled from the axle 3 and the axis of rotation 6 of roller 2 and from each other and join at point 33 which is approximately the midpoint of roller 2. As vanes 31 and 32 progress inwardly from the respective ends of roller 2, they advance around the surface or circumference of roller 2 in the direction of rotation 35 of roller 2. Thus they meet at approximately midpoint 33 in a generally v-shaped configuration. These vanes 31 and 32 will tend to disperse the material pieces somewhat in the direction of the respective ends of the roller as shown by arrows 34 thereby resulting in a fan-like pattern that widens as the distance from roller 2 increases. This is a wider pattern than would be obtained from the vane configuration shown in FIG. 1 in which the vanes are parallel to axle 3. A small angle of deviation of vanes 31 and 32 from axle 3 will normally provide sufficiently wide dispersion of pieces, depending upon such factors as speed of rotation of roller 2. An advancement of vanes 31 and 32 around the circumference of roller 2 in the range of one to three inches for each 12 inches of length of vanes 31 and 32 has been found advantageous in some applications. Of course, if the respective angles were reversed, the pattern of dispersal of the material pieces would tend to be concentrated which might be advantageous in some situations.

FIG. 4 shows still another embodiment of the invention in which three vanes 41, 42, and 43 having different angles with respect to axle 3 are mounted along the length of roller 2. Vanes 41 and 43 are angled from axle 3 similarly to vanes 31 and 32 of FIG. 3 whereas vane 42 is parallel to axle 3. As illustrated by arrows 44, this embodiment will provide a different dispersal pattern for the pieces from the vane configurations shown in FIGS. 1 and 3. Numerous other configurations for the vanes of this invention, which might be optimal for different situations, will be readily apparent to those skilled in the art. For example, shorter, overlapping vanes or a mixture of vane configurations might be useful for some applications. Curved vanes might be advantageous in some applications. Further, because of the simplicity of design, roller 2 could be mounted in such a manner to permit easy and rapid exchange of one roller having one configuration of vanes for another roller having a different configuration of vanes.

It will be obvious to those skilled in the art that many modifications and variations may be made to the specific embodiments of the present invention described above without departing from the spirit and scope of the present invention. All such modifications and variations are intended to be included within the scope of the present invention.

I claim:

1. An apparatus for dispersing into a storage area particulate material pieces exiting in a stream from a supply outlet in order to achieve efficient and compact accumulation of the material pieces in the storage area and comprising a propelling apparatus having an axis of rotation across the stream of material pieces exiting the supply outlet, said propelling apparatus being positioned with respect to the stream of material pieces such that it engages and propels the material pieces outwardly from the stream into said storage area, said propelling apparatus comprising an elongated body having first and second ends, a length and a midpoint, and having an exterior surface and further including a plurality of vanes on the exterior surface of said elongated body and extending outwardly therefrom for engaging and propelling the material pieces, wherein said plurality of vanes comprises at last two sets of vanes mounted at different angles with respect to said axis, and wherein the vanes in each set are approximately one-half the length of the elongated body on which said vanes are mounted.

2. An apparatus for dispersing into a storage area particulate material pieces exiting in a stream from a supply outlet in order to achieve efficient and compact accumulation of the material pieces in the storage area and comprising a propelling apparatus having an axis of rotation across the stream of material pieces exiting the supply outlet, said propelling apparatus being positioned with respect to the stream of material pieces such that it engages and propels the material pieces outwardly from the stream into said storage area, said propelling apparatus comprising an elongated cylindrical body having first and second ends, a length and a midpoint, and having an exterior surface and further including a plurality of vanes on the exterior surface of said cylindrical body and extending outwardly therefrom for engaging and propelling the material pieces, wherein said plurality of vanes comprises at least two sets of vanes mounted at different angles with respect to said axis, and wherein the vanes in each set are approximately one-half the length of the cylindrical body on which said vanes are mounted.

3. An apparatus for dispersing into a storage area particulate material pieces exiting in a stream from a supply outlet in order to achieve efficient and compact accumulation of the material pieces in the storage area and comprising a propelling apparatus having an axis of rotation across the stream of material pieces exiting the supply outlet, said propelling apparatus being positioned with respect to the stream of material pieces such that it engages and propels the material pieces outwardly from the stream into said storage area, said propelling apparatus comprising an elongated cylindrical body having first and second ends, a length and a midpoint, and having an exterior surface and further including a plurality of vanes on the exterior surface of said cylindrical body, said vanes being less in length than the length of the cylindrical body and extending outwardly therefrom for engaging and propelling the material pieces, wherein said plurality of vanes comprises two sets of vanes mounted at different angles with respect to said axis of rotation, and wherein a first set of such vanes is mounted such that the vanes thereof advance around the circumference of said cylindrical body in the direction of rotation of said cylindrical body as the vanes progress inwardly from the first end of the cylindrical body, and a second set of vanes is mounted such that the vanes thereof advance around the circumference of said cylindrical body in the direction of rotation of said cylindrical body as the vanes progress inwardly from the second end of said cylindrical body.

4. The apparatus of claim 3 wherein said vanes are approximately one-half the length of the cylindrical body, a first set of said vanes extending inwardly along the length of the cylindrical body from the first end thereof to approximately the midpoint of said cylindrical body and a second set of vanes extending inwardly from the second end thereof to approximately the midpoint of said cylindrical body.

5. The apparatus of claim 3 wherein said vanes are approximately one-half the length of the cylindrical body, a first set of said vanes extending inwardly along the length of the cylindrical body from the first end thereof to approximately the midpoint of said cylindrical body and a second set of vanes extending inwardly from the second end thereof to approximately the midpoint of said cylindrical body, respective ones of said vanes of the first and second sets intersecting at approximately said midpoint, whereby the respective vanes of the first and second sets form an approximate v-shaped configuration at the intersection thereof.

6. The apparatus of claim 3 wherein said vanes are approximately one-half the length of the cylindrical body, a first set of said vanes extending inwardly along the length of the cylindrical body from the first end thereof to approximately the midpoint of said cylindrical body and a second set of vanes extending inwardly from the second end thereof to approximately the midpoint of said cylindrical body, said vanes of the first and second sets intersecting at approximately said midpoint, and wherein said vanes advance around the circumference as aforesaid at the rate of approximately one to two inches per twelve inches of length of said vanes.

7. The apparatus of claim 3 wherein at least one of said vanes comprises a support bracket mounted to the exterior surface and having a first side in the direction of rotation of said cylindrical body, and a striking plate detachably connected to said support bracket on said first side for engaging and propelling said material particles.

8. The apparatus of claim 7 wherein said striking plate extends further outward from the surface of said cylindrical body than said support bracket thereby to protect said support bracket from wear.

9. The apparatus of claim 8 wherein said striking plate extends outward from said exterior surface approximately two to four inches.

10. A method of dispersing wood chips exiting in a stream from a supply outlet into a storage area so as to achieve efficient and compact accumulation of said chips in said area, comprising the steps of positioning an elongated, rotatable propelling apparatus with an axis of rotation across said seam of chips, said apparatus including a plurality of outwardly extending vanes that are approximately one-half the length of said apparatus and mounted at different angles with respect to said axis of rotation, rotating said apparatus about said axis, feeding said stream of chips such that they strike said apparatus, and flinging said chips into said storage area in a manner so as to obtain efficient dispersal and compact storage of said chips in said area.

* * * * *